Figure 1:
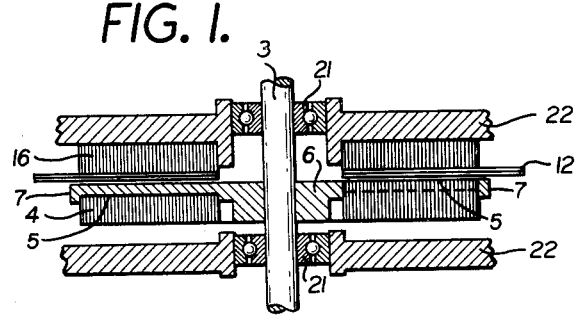

July 18, 1961     J. HENRY-BAUDOT     2,993,135
STATORS OF ELECTRIC MACHINES

Filed Dec. 16, 1958     2 Sheets-Sheet 1

INVENTOR
JACQUES HENRY-BAUDOT
ATTORNEY

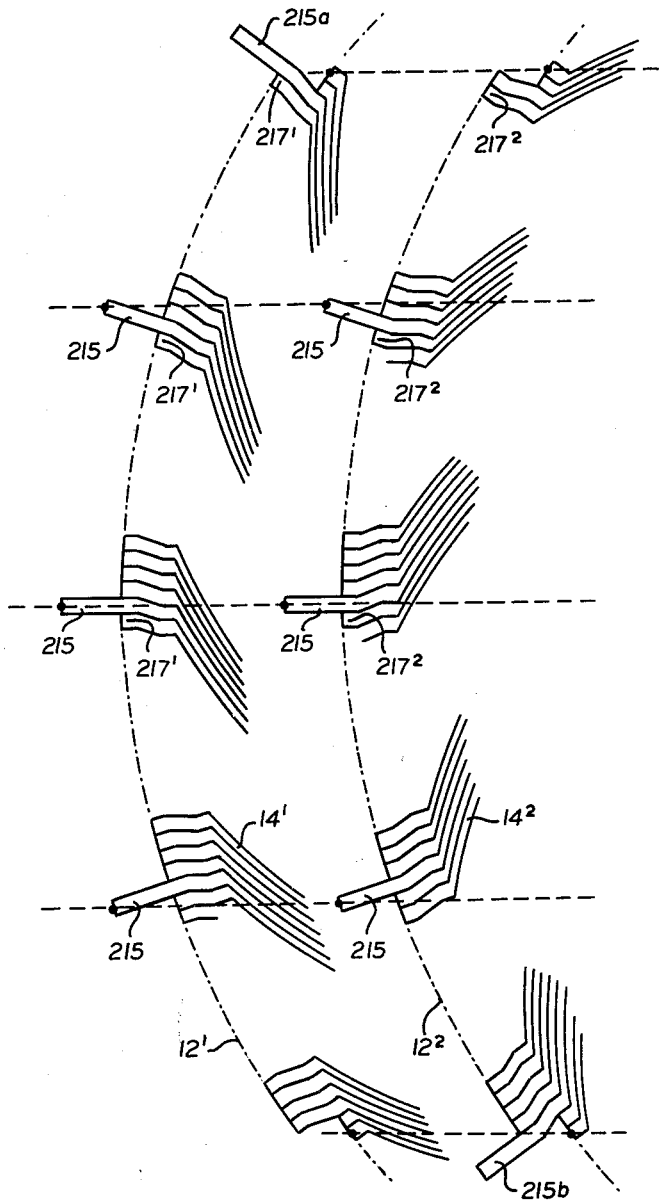

United States Patent Office 2,993,135
Patented July 18, 1961

2,993,135
STATORS OF ELECTRIC MACHINES
Jacques Henry-Baudot, Cold Spring Harbor, N.Y., assignor to Printed Motors, Inc., New York, N.Y., a corporation
Filed Dec. 16, 1958, Ser. No. 780,754
Claims priority, application France Aug. 13, 1958
4 Claims. (Cl. 310—180)

This invention relates to improvements in/or relating to rotating electrical machines disclosed in co-pending applications Ser. No. 691,434 filed October 21, 1957; 761,143 filed September 15, 1958; and 761,144 filed September 15, 1958.

A rotating machine in accordance with the first application comprises at least two elements, at flat stator and a flat rotor, each having an active surface of annular configuration and both forming between themselves a narrow airgap of the same configuration. At least one of these elements supports a winding formed thereon by a prefabrication process, preferably a printed circuit technique, permitting the realization of flat conductors adhering to an insulating or magnetic surface. At least one of these elements consists principally of magnetic material.

Said copending application 691,434, and a continuation-in-part thereof filed January 7, 1960, discloses an element serving as a rotor for D.C. machines, alternating and commutating. This rotor includes a winding of the series-wave type having overlapping spirals realized by printing the conductors on the two faces of a thin supporting disc of dielectric or magnetic material.

In the above mentioned co-pending application Ser. No. 761,144, such an element has been used as a stator for an asynchronous motor, the rotor of which is of the squirrel cage type and also of planar configuration. The stator winding is fed through a number of taps distributed over its periphery, and corresponding to the phases of the A.C. supply.

As a modification, it has been provided that the series-wave winding can be opened at certain points and connected in a convenient fashion at the different ingress and egress taps thus obtained.

In the embodiments thus described, the interconnections between the two faces of the winding and also the input and output taps for the different phases are arranged along two concentric external and internal circles of the element, and more particularly, of its dielectric support ring.

One of the objects of the present invention is to improve such double-face winding structure for A.C. machines, especially in the case of a winding containing a very large number of conductors. This is particularly desirable in printed circuits where as many conductors as possible have to be connected in series to increase the electromotive forces. This, in effect, can only be realized in the form of a closed and symmetrical winding of the series-wave type such as provided herein. This type of winding, however, presents arithmetic conditions for the number of conductors which substantially limit the combinations possible. They also result in odd divisions for the annular surfaces supporting these windings and in odd divisions for the windings themselves.

It is another object of the invention to eliminate these disadvantages and facilitate the arrangements of the taps, and as a further object of the invention, the taps are realized in such a manner as to permit whenever necessary to stagger or jump by one step or a fraction thereof, the interconnections between the conductors of the two faces; with the two conductor groups thus formed even divisions in these windings can be established.

A more specific object of the invention is to provide a double-face winding element with radially displaced curved end portions extending over one and/or the other of its external and internal peripheries.

Still another object of the invention is to establish arrays of interconnections by conductor end portions located at diameters larger and smaller than the "normal" diameters of the winding, and according to a further object of the invention, parts of these curved end portions are connected to terminal strips for one and/or other faces of the element.

These and other objects of the invention will be more fully described in connection with the drawings enclosed herewith in which:

FIG. 1 shows schematically in cross section a machine assembly embodying certain principles of the invention.

Figure 2:
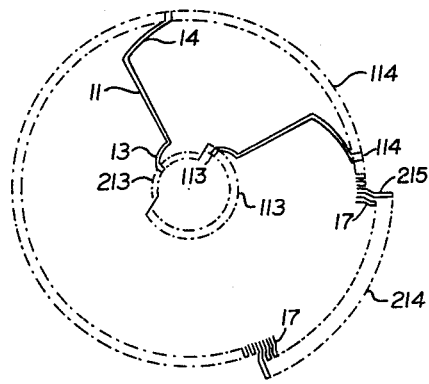

FIG. 2 presents in a rather simplified manner the stator winding conductors of such a machine, also embodying certain features of the invention.

FIG. 3, in an enlarged view, illustrates winding portions realized in accordance with the invention. For clarity's sake, front and rear portions of these windings are shown displaced laterally with respect to each other and the support is assumed to be transparent.

Figure 4:
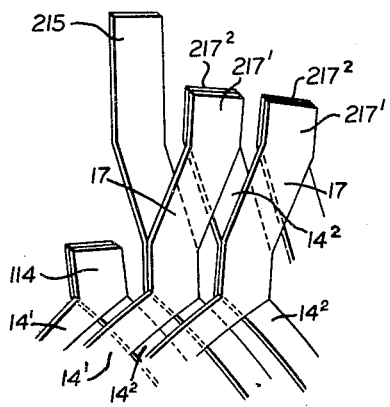

FIG. 4 shows in oblique projection an enlarged and partial view of the arrangement of FIG. 3, with the conductors on the front and rear faces being brought into contiguous relation as they are in practice.

The drawings present only one example of realizing rotating electrical machines in conformance with the invention. It is possible to derive therefrom as many variations as desirable. In the example shown, the arrangement of the conductors on the two faces of the winding support are presumed to be of identical design. The invention may also be applied where the designs of two faces are not identical.

Referring to the type of rotating machine for A.C. supply under consideration, FIG. 1 shows a rotor consisting of a squirrel cage developed into a plane or flat disc structure and realized, for example, by molding radial or sensibly radial conductors 5 together with hub 6 onto a shaft 3. The conductors 5 are arranged in open recesses or slots in the face (facing the stator) of a flat ring of magnetic material 4 and are joined at their outer ends by an integrally formed ring 7, see co-pending application Ser. No. 761,144. Ring 4, for example, is realized by winding magnetic band metal into a coil. The magnet band previously has been provided with indentations forming the recesses for the conductors. Shaft 3 is supported in bearings 21 of housing walls 22, one of which supports a magnetic ring 16, for example, of the same type as ring 4, but not provided with recesses.

Stator 12 consists, as stated above, of a winding printed on both faces of a thin annular support of dielectric or magnetic material. It is glued or otherwise attached to the free face of magnetic structure 16. As shown, schematically only in FIG. 2, the printed conductors of stator 12 of which for clarity's sake only two are drawn, consist each of a substantially radial portion 11 terminated by two curved portions, an internal portion 13 and an external portion 14.

It is also feasible to make each conductor entirely curved, whether uniformly or not, without substantially altering the characteristics of the winding.

Portion 13 terminates in small tongue or tab 113 and each portion 14 in small tab 114. Tabs 113, 114 form the interconnections between the conductors on front and rear faces, respectively, as illustrated, for example, in FIG. 4, where a front face conductor $14^1$ is shown to be connected electrically to a rear face conductor $14^2$ by tabs 114. These evidently are nothing but ordinary connections and obviously the same type of connection will be assured by tabs 113 on the inner periphery of stator 12.

In accordance with the present invention, arcs 213 and 214 represent the inner and outer arrays of tabs 113, 114, respectively which provide face-to-face interconnections immediately adjacent the edges of the annular support, not shown. These arrays of tabs are, of course, interrupted along these arcs. As apparent from FIGS. 3 and 4, arcs 213, 214 are formed by extending the inclined conductors 14 by inclined extensions 17 of some length. These inclined extensions 17 terminate in tabs shown at $217^1$ for half winding $12^1$ and $217^2$ for half winding $12^2$ embodying conductors $14^1$ and $14^2$, respectively, of the two faces. From FIG. 4 it will be seen that each extension 17 is arranged in crossing relation with at least two extensions 17 on the opposite face of the support.

The example of FIGS. 3 and 4 relates to the external periphery of the stator. From that the disposition on the internal periphery can be directly derived. It should be noted, however, that in most practical cases it will only be sufficient to provide such extensions over one periphery only.

Furthermore, as indicated at 215, certain conductors are extended into still longer strips. Strips 215 are designed to provide supply taps for the winding. If desired, depending upon the electric circuit involved, certain strips 215 while being superimposed in space can also be electrically connected by welding or brazing. Alternatively, they may be left independent, insulated from and, for example, superimposed upon each other.

In FIGS. 3 and 4, the thin dielectric support of the winding has been omitted. It consists of a plastic foil or sheet, for example, of material marketed as Mylar. This foil separates conductors and strips of both faces, the strips being separated only over part of their length to permit welding or brazing. Alternatively, instead of a Mylar foil, a thin disc of plastic material but of much greater thickness may be used. In this case, the interconnection between the strips can be realized by corresponding metalizations of the edge of the disc.

The diagram of FIG. 4 indicates part of the peripheries where a strip 215 serves as electric entry point for the winding. Entry strip 215 is only connected to a rear conductor portion $14^2$. Front conductor $14^1$ which normally ought to be connected by tab $217^1$ to a corresponding tab of the rear conductor connected to entry point 215, is instead connected by extensions 17 and tabs $217^1$ and $217^2$ to the next rear conductor $14^2$ following that conductor which is connected to strip 215. In effect, therefore, a jump or displacement of one conductor spacing is effected in the connection from the front half winding to the rear half winding by conductor extensions 17.

All that applies to points of "entry" also may be assumed to apply to points of "exit" for the supply current in accordance with the feeding requirements of the winding.

Preferably, as apparent from FIG. 3 points of "entry" are formed by strips 215 of one face and points of "exit" by strips 215 of the other face. Two such entry and exit strips 215 are indicated in FIG. 3, see $215a$ at the "top" of winding $12^1$ and $215b$ at the bottom of winding $12^2$, respectively. As a result of these "jumps" of conductors, eventually, in the complete winding, maintenance of odd divisions in the winding are avoided and entries and exits as stated above are established along the same "sector" by means of strips 215 which while coinciding in space are electrically not interconnected.

From the foregoing the manner and flexibility with which the invention can be applied will be readily appreciated.

I claim:

1. A winding structure for rotating electrical machines comprising a flat annular support and a planar electrical winding extending in half spirals over both surfaces of said support, each half spiral including a conductor arranged on one face of said support and extending from a point near the inner periphery of the support to a point near the outer periphery of said support, each conductor having one end thereof extended beyond one periphery of said annular support by tab extensions, the tab extensions for certain conductors spaced about said annular support being shorter than the tab extension of other conductors and being connected to corresponding tab extensions on the opposite face of said support and forming a first annular array of interconnections adjacent the periphery of the support, and the tab extensions of other conductors spaced about said support being of longer length and inclined to the radius of said annular support and connected at their outer ends to corresponding tab extensions on the opposite face of said support to form a second annular array of interconnections located at a greater radial distance from the center of said support than said first array, the tab extensions of said second annular array being arranged in insulated crossing relation with at least one corresponding tab extension on the opposite face of the support.

2. A winding structure according to claim 1 wherein said tab extensions are located at the outer periphery of said support.

3. A winding structure according to claim 1 wherein said tab extensions are located at both peripheries of said annular support.

4. A winding structure according to claim 1 wherein a third set of conductors are provided with tab extensions extending beyond the second annular array of interconnections and forming supply terminals for said winding.

References Cited in the file of this patent

UNITED STATES PATENTS

| | | |
|---|---|---|
| 1,656,933 | Ahlstrand | Jan. 24, 1928 |
| 1,801,214 | Von Henke | Apr. 14, 1931 |
| 2,441,960 | Eisler | May 25, 1948 |
| 2,765,448 | Duffing | Oct. 2, 1956 |